United States Patent [19]

Boehringer

[11] 4,294,163

[45] Oct. 13, 1981

[54] NON ADJUSTABLE HYDRAULIC CYLINDER

[75] Inventor: Wilfred E. Boehringer, Fullerton, Calif.

[73] Assignee: McDonnell Douglas Corporation, Long Beach, Calif.

[21] Appl. No.: 88,943

[22] Filed: Oct. 29, 1979

[51] Int. Cl.³ .............................. F01B 7/20; F16J 1/10
[52] U.S. Cl. ......................................... 92/52; 92/143; 92/165 R; 92/255
[58] Field of Search ................. 92/179, 167, 110, 191, 92/255, 51, 63, 165 R, 52, 258, 143

[56] References Cited

U.S. PATENT DOCUMENTS

| | | | |
|---|---|---|---|
| 850,583 | 4/1907 | Howard | 92/51 |
| 2,417,887 | 3/1947 | Schmidt | 92/258 |
| 2,642,138 | 6/1953 | Macewka | 92/51 |
| 2,649,842 | 8/1953 | Caldwell et al. | 92/52 |
| 2,667,035 | 1/1954 | Marsden | 92/52 |
| 3,402,592 | 9/1968 | Machon et al. | 92/52 |
| 3,514,057 | 5/1970 | Biggs | 92/51 |
| 4,125,059 | 11/1978 | Tuji | 92/51 |

*Primary Examiner*—Paul E. Maslousky
*Attorney, Agent, or Firm*—George W. Finch; Donald L. Royer; John P. Scholl

[57] ABSTRACT

A hydraulic actuator cylinder primarily for the actuation of aircraft landing gear in which the rod end is made integral with the piston rod with the attaching threads positioned inside the cylinder. The piston head is designed to float on the piston rod plus or minus the amount of adverse tolerance conditions that are possible in the landing gear installation.

4 Claims, 6 Drawing Figures

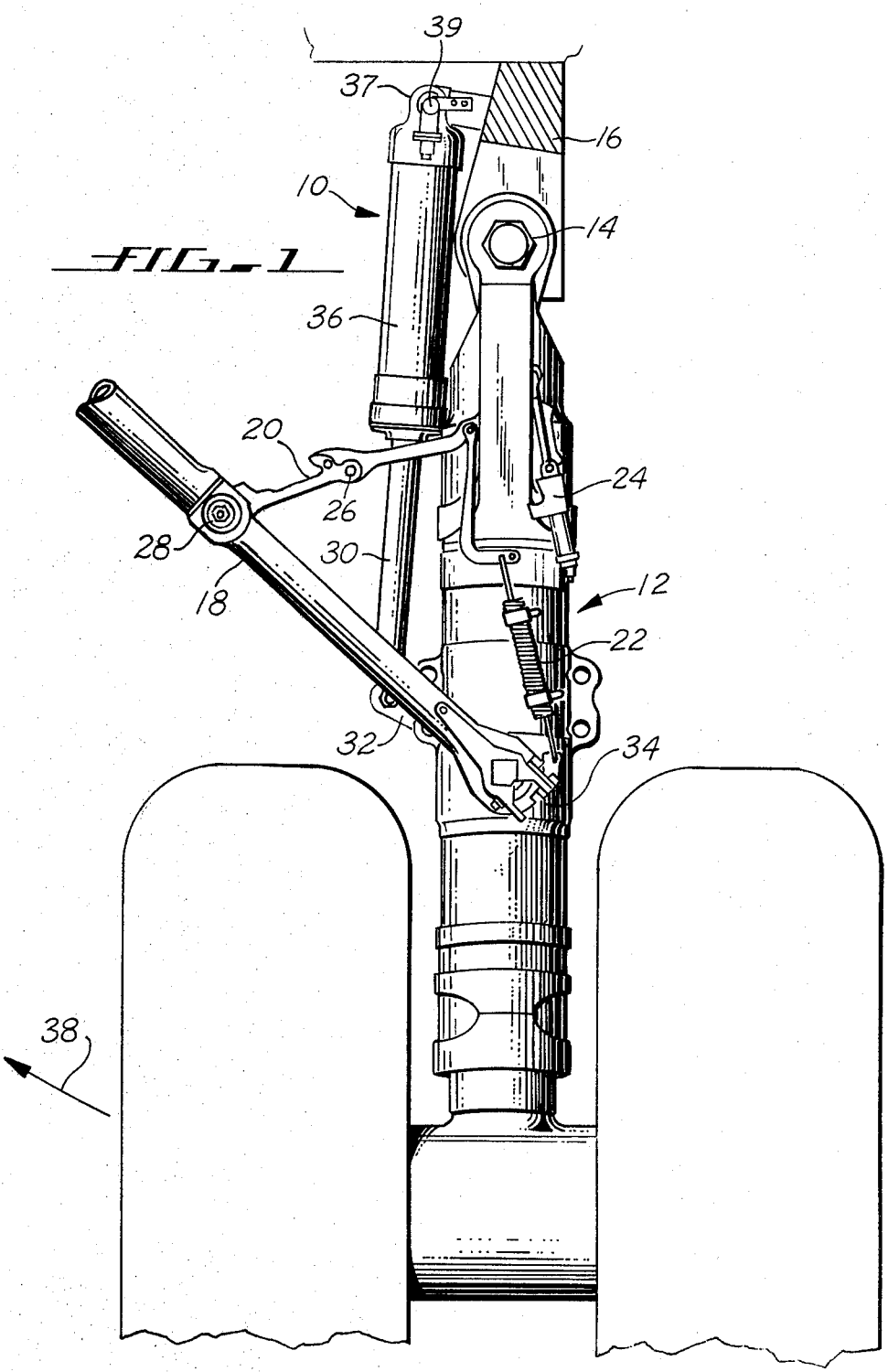

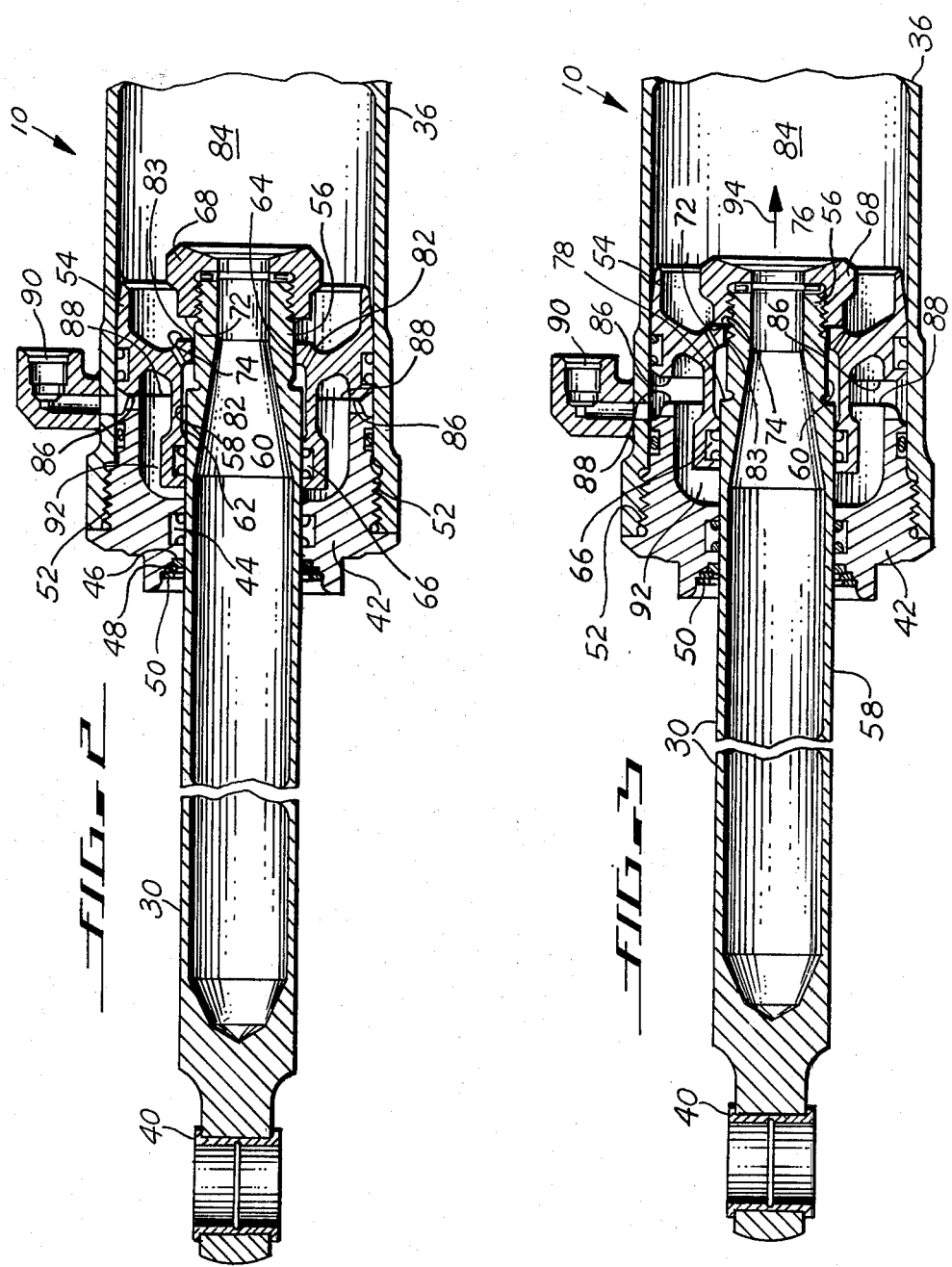

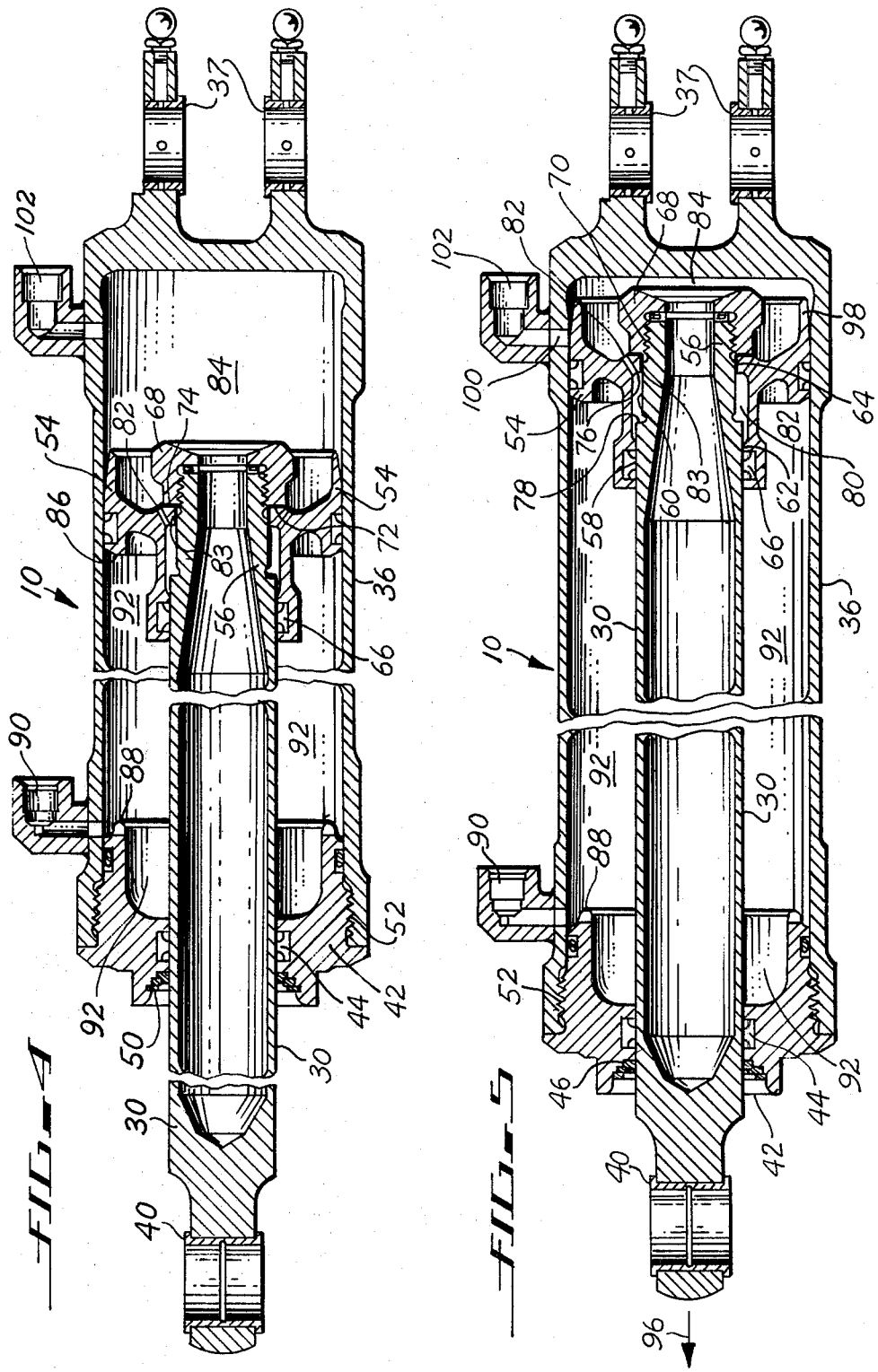

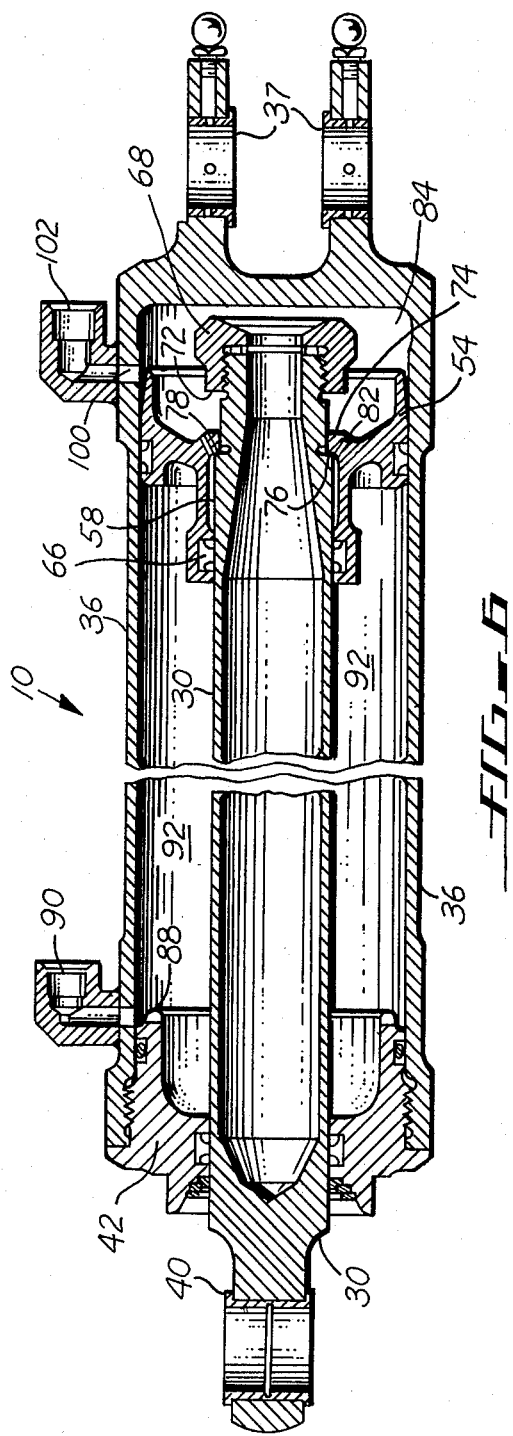

NON ADJUSTABLE HYDRAULIC CYLINDER

BACKGROUND OF THE INVENTION

Landing gear retract actuators on most aircraft use adjustable rod ends for cylinder length adjustment. These rod ends have had a history of corrosion problems at the thread engagement. Some have even failed when the corrosion goes unnoticed allowing the landing gear to extend unrestrained. Heretofore, landing gear retract actuators have been adjustable externally because they had to be bottomed when the landing gear was fully extended. This bottomed condition was necessary to prevent inadvertent unlocking of the gear down latch. When the normal hydraulic pressure to extend the landing gear is lost the gear must be extendable by an alternate extension method which is usually "free fall". If the retract actuator is not bottomed under this unpressurized condition, it can act as a pump when the landing gear flexes during normal brake application. The retract actuator and the latch actuator usually are hydraulically plumbed in parallel, so that any pressure generated in the retract actuator is also seen at the latch actuator. In some instances the pressure created by the pumping action of the retract actuator could be sufficient to unlock the latch actuator and allow collapse of the landing gear.

Therefore, there has been a need for a new landing gear retract actuator which does not include external threads and which is designed so that its rod end does not need to be adjusted. There has also been a need to provide such an actuator in which the fatigue loads into the shock strut lug and the upper attachment fitting between which the actuator operates are greatly reduced.

BRIEF DESCRIPTION OF THE PRESENT INVENTION

The present retract actuator includes a cylinder in which a piston and rod are driven by selective application of hydraulic pressure. The rod end is made integral with the piston rod. The piston attaching threads needed for assembly are placed inside the cylinder where they are protected from corrosion. The piston head is restrained within a predetermined tolerance by opposed abutment surfaces on the rod so that it can float on the piston rod plus or minus the amount of adverse tolerances expected in a particular installation. Since in a landing gear system, the load is almost always unidirectional, the piston is normally engaged with the piston rod end except when the rod is fully extended. When the rod is extended, the piston head bottoms first allowing the rod to extend further with a greatly reduced area or force. This reduced area is small enough to greatly reduce the extended load, and prevent adverse pressures due to cylinder pumping. Since the actuator uses a floating piston to provide for adverse installation tolerances, no rod adjustment is required, greatly speeding up production and maintenance and at the same time preventing adverse rod side pressures caused by cylinder pumping.

It is therefore an object of the present invention to eliminate corrosion prone threads on the rod ends heretofore used for hydraulic cylinder length adjustment.

Another object is to provide a hydraulic landing gear actuator which does not have to be adjusted.

Another object is to greatly reduce the fatigue loads fed to the shock strut lug and upper attachment fitting of a landing gear caused by the normally large extension forces of the retract actuator during the last portion of gear extension and the flexing of the landing gear during braking.

Another object is to provide a landing gear retract actuator which has a greatly reduced pumping action when compared to conventional landing gear actuators during limited stroking caused by normal gear deflections.

Another object is to provide a landing gear retract actuator which is relatively maintenance free and which can be constructed in a normal production environment.

These and other objects of the present invention will become apparent to those skilled in the art after considering the following detailed specification in which a preferred embodiment is described in conjunction with the accompanying drawings wherein:

BRIEF DESCRIPTION OF THE DRAWINGS

FIG. 1 is an elevational view of a main landing gear assembly in its extended position having a landing gear retract actuator installed thereon constructed according to the present invention;

FIG. 2 is a cross-sectional view of the actuator of FIG. 1 in its extended position;

FIG. 3 is a cross-sectional view of the actuator of FIGS. 1 and 2 just after the start of a retraction cycle;

FIG. 4 is a cross-sectional view of the actuator of FIGS. 1, 2 and 3 partially through its retraction or extension cycle;

FIG. 5 is a cross-sectional view of the actuator of FIGS. 1 through 4 in its retracted condition; and FIG. 6 is a cross-sectional view of the actuator of FIGS. 1 through 5 in an abnormal condition during a landing gear extension cycle such as might be caused by a jammed landing gear.

DETAILED DESCRIPTION OF THE SHOWN EMBODIMENT

Referring to the drawings more particularly by reference numbers, number 10 in FIG. 1 refers to a landing gear actuator constructed according to the present invention. The actuator 10 is shown installed on a main landing gear 12 which is connected by a pivot 14 to an upper attachment fitting 16 of the aircraft. The landing gear 12 is shown in its extended position with its on-center side brace link 18 locking the landing gear 12 in that position. The link 18 is retained in the position shown by a latch link 20 which is biased to the position shown by means of a spring 22. The latch link 20 can be moved from that position by pressurizing a latch cylinder 24 connected thereto. It is usual that the latch cylinder 24 be plumbed in parallel with the actuator 10 so that the operation thereof is automatically synchronized.

When it is desired to retract the landing gear 12 from the position shown in FIG. 1, the latch cylinder 24 and the actuator 10 are pressurized. The latch cylinder 24 moves the latch 20 so that it bends at its latch pivot 26 thereby also bending the link 18 at its on-center pivot 28. The actuator 10 has a rod connected to a lug 32 on the shock strut 34 of the gear 12 whereas the cylinder 36 thereof is connected to the upper attachment fitting 16 by means of a clevis 37. When pressurized for retraction, the actuator 10 retracts the rod 30 inwardly, drawing the landing gear 12 upwardly in the direction of arrow 38 to a position rotated about the clevis bolt 39 approximately 90° from that shown. The weight of the landing gear 12 usually provides a uni-directional load on the actuator 10 due to the force of gravity thereon which tends to move it to the position shown in FIG. 1. This is desirable since when hydraulic pressure is lost, it is desired that the landing gear 12 move to the position shown in FIG. 1 through "free fall" so that the loss of hydraulic pressure does not result in the inability to extend the landing gear 12 for a safe landing. As shown in FIG. 2, the actuator 10 includes a rod 30 with an integral rod end 40 for connection to the lug 32. Usually, rod ends on landing gear retraction actuators are threadably attached to the rod so that they can be adjusted to bottom the cylinder internally when the landing gear is fully extended. The adjustment of such rod ends can be a time consuming maintenance headache and the exposed threads required for such adjustment subject the rod end to corrosion which causes additional maintenance problems.

The rod 30 extends through a gland 42 which forms one end of the cylinder 36 past a suitable seal 44, scraper 46, washer 48 and retaining ring 50. The gland 42 is connected to the cylinder 36 by threads 52 therebetween. A floating piston 54 is retained on the inner end 56 of the rod 30 from the rod end 40. The inner end 56 of the rod 32 includes two cylindrical surfaces 58 and 60 of slightly differing diameters on which inner cylindrical surfaces 62 and 64 of the piston 54 slide (FIG. 5). A seal assembly 66 is provided in the cylindrical surface 62 to prevent fluid from passing between the piston 54 and the rod 30.

A nut 68 is engaged with the end 56 by means of threads 70 thereon. The nut 68 includes a sidewardly facing abutment surface 72 which engages a similar abutment surface 74 on the piston 54 to restrict the movement of the piston 54 on the rod 30 in one direction. A sidewardly facing radial abutment surface 76 on the piston 54 faces and engages a sidewardly facing radial abutment surface 78 on the rod a predetermined distance away from surface 72. The distance between surfaces 72 and 76 and the distance between the surfaces 74 and 76 on the piston 54 predetermine the amount of float of the piston 54 with respect to the rod 30. A small chamber 80 is defined between the piston 54 and the rod end 56. This chamber is restrictively vented by orifices 82 and an annulus 83 between the nut 68 and the piston 54 to allow the piston 54 to move between the surfaces 72 and 78. The restrictive nature of the orifices 82 and the annulus 83 is minimal but the area difference caused by the differing diameters of the surface 58 dampens movement of the piston 54 with respect to the rod 30 so that the engagement of the abutment surfaces 72 and 74, or abutment surfaces 76 and 78 is not needlessly abrupt.

When the rod 30 is fully extended, as shown in FIG. 2, the stop portions 86 of the piston 54 are in contact with stop portions 88 of the gland 42. The predetermined float mentioned above and the maximum extension of the rod 30 as determined by the geometry of the landing gear 12 is such that the abutment surfaces 72 and 74 or 76 and 78 are not in contact. This means that the fluid within chamber 84 acts only on the area of the rod end 30 to reduce the force thereon but to retain it in its bottomed condition. Movement of the rod 30 within the cylinder 36 causes only small pumping pressures due to the reduced area of the rod 30 since the piston 56 is more or less free to remain in the position shown as long as the rod 30 is moved within the predetermined float distance.

When it is desired to retract the rod 30 and thus retract the landing gear 12, pressure is applied through port 90 into the retraction chamber 92. This causes the piston 54 to move with respect to the rod 30 until its abutment surface 74 contacts the abutment surface 72 of the nut 68 connected to the rod 30. At this point, the force generated by the entire area of the piston 54 is applied to the rod 30 causing it to retract in the direction shown by arrow 94.

Thereafter, the piston 54 and the rod 30 move as an unitary structure as shown in FIG. 4 since the load applied to the rod 30 essentially is uni-directional in the direction of the arrow 96. The motion of the rod 30 continues until the rod 30 and the piston 54 reach the position shown in FIG. 5 wherein the piston skirt 98 meters off the opening 100 to the extension port 102 and the piston 54 is stopped by the landing gear 12 completing its up travel. Since the load on the rod 30 still is in the direction of the arrow 96, the abutment surfaces 72 and 74 remain in abutment so long as the retraction chamber 92 is pressurized.

When it is desired to extend the actuator 10 pressurized fluid is fed through port 102 into the chamber 84 to move the piston 54 and the rod 30 in the extending direction opposite to arrow 94. However, the abutment surfaces 72 and 74 still remain in contact as shown in FIG. 4 which represents the normal configuration of the actuator 10 during both a retraction or extension cycle due to the uni-directional load 96 since although the chamber 84 is pressurized, the gear 12 extends essentially due to its own weight.

There is, in some instances, a possibility that the gear 12 will not fall by its own weight if it has sustained some sort of damage which jams the pivotal action thereof. This condition is shown in FIG. 6, wherein the piston 54 has moved with its abutment surface 76 in contact with the abutment surface 78 of the rod 30. This enables the entire area of the piston 54 and the rod 30 to be used to generate force to overcome the jam. Once the jam is overcome, the configuration will go back to that shown in FIG. 4 for the remainder of the extension cycle until the rod 30 reaches the position shown in FIG. 2 wherein the piston 54 is stopped from further travel.

Thus there has been shown and described a novel landing gear retractable cylinder which eliminates the need for external adjustment threads and which reduces the fatigue loads applied to the landing gear during normal operation and therefore fulfills all of the objects and advantages sought therefore. Many changes, modifications, variations and other uses and applications of the subject invention will become apparent to those skilled in the art however after considering this specification together with the accompanying drawings. All such changes, modifications, variations and other uses and applications which do not depart from the spirit and scope of the invention are deemed to be covered by the invention which is limited only by the claims which follow.

What is claimed is:

1. A dual acting hydraulic actuator primarily for the actuation of aircraft landing gear including:

a hydraulic cylinder having first and second ports for flowing fluid in and out thereof, a first end having a gland therein, and a second end having an attachment fitting;

a rod having first and second end portions and a central cylindrical portion of predetermined diameter therebetween, said first end portion having a rod end thereon and said central cylindrical portion being positioned to slide through said gland; and a piston mounted to said second end portion of said rod for limited sliding movement a predetermined distance with respect thereto and sliding movement in said hydraulic cylinder in response to fluid pressure applied through said first and second ports, said piston including first and second abutment surfaces, said rod second end portion having first and second abutment surfaces positioned to engage said first and second abutment surfaces of said piston, said first and second abutment surfaces of said piston being closer together than said first and second abutment surfaces of said rod second end portion so that said predetermined distance of relative movement between said piston and said rod is defined by the difference therebetween, said rod second end portion also including an end cylindrical portion between said first and second abutment surfaces thereof, said end cylindrical portion having a diameter which is less than the diameter of said central cylindrical portion, and said piston further including first and second interior cylindrical surfaces which slide on said central cylindrical portion and said end cylindrical portion of said rod respectively, said piston and said rod defining a damping chamber between said first and second interior cylindrical surfaces, and at least one damping orifice establishing a flow path between said damping chamber and one of said ports.

2. The hydraulic actuator as defined in claim 1 wherein said first abutment surface of said rod second end portion is a radial abutment surface facing said second abutment surface of said rod second end portion.

3. The hydraulic actuator as defined in claim 1 wherein said first and second abutment surfaces of said rod second end portion are radial abutment surfaces facing each other.

4. The hydraulic actuator as defined in claim 1 wherein said rod end is integral with said rod.

* * * * *